Patented July 24, 1934

1,967,356

UNITED STATES PATENT OFFICE 1,967,356

QUINOLINE DERIVATIVES AND A PROCESS OF PREPARING THEM

Otto Eisleb, Hofheim-in-Taunus, Germany, assignor to Winthrop Chemical Company, Inc., New York, N. Y., a corporation of New York No Drawing. Application November 12, 1930, Serial No. 495,295. In Germany December 6, 1929

5 Claims. (Cl. 260—38)

The present invention relates to quinoline derivatives and a process of preparing them, more particularly to compounds of the following general formula:

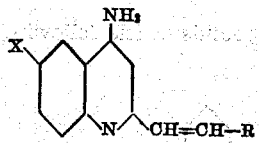

wherein X stands for hydrogen or alkoxy containing no more than 2 carbon atoms and R stands for alkyl or aralkenyl.

I have found that 4-aminoquinolines, containing in 2-position an unsaturated side chain consisting of at least 3 carbon atoms, and which may contain any substituent or substituents, are distinguished by a bactericidal action which surpasses that of the 2-styryl-4-amino-quinolines obtainable according to German specification 440,008.

The new compounds can be obtained by substituting in any order of succession in 2-methyl-4-halogen-quinoline, or in a nuclear substitution product thereof, an amino-group for halogen and converting the 2-methyl-group with alkyl-, alkylene-, aralkyl, or aralkylene-aldehydes into an unsaturated radical.

The procedure may for instance be as follows: a 2-methyl-4-halogen-quinoline is condensed with an alkyl-, alkylene-, aralkyl-, or aralkylene-aldehyde and the 4-halogen-quinoline formed, containing in 2-position an unsaturated chain consisting of at least 3 carbon atoms, is heated with ammonia or a primary or secondary amine; or a 2-methyl-4-halogen-quinoline is transformed by heating with ammonia or a primary or secondary amine into a 2-methyl-4-amino-quinoline and this is condensed with an alkyl-, alkylene-, aralkyl- or aralkylene aldehyde.

The following examples serve to illustrate the invention, but they are not intended to limit it thereto; the parts are by weight, unless otherwise stated:

1. 221.5 parts of 6-ethoxy-4-chloro-2-methyl-quinoline, 114 parts of oenanthic aldehyde (heptanal) and 1 part of zinc chloride are heated together for 4 hours at a temperature of 120° C.-130° C. The reaction takes place according to the following equation

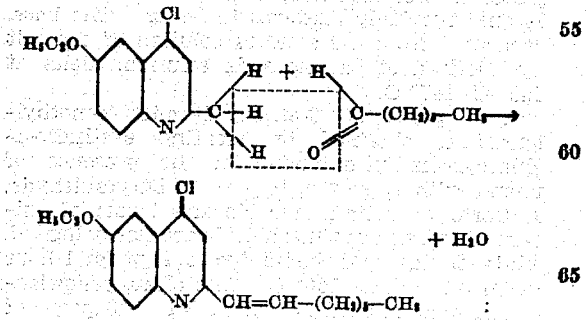

The water split off is distilled in a vacuum. The resinous melt, mainly consisting of 6-ethoxy-4-chloro-2-octenyl-quinoline, is dissolved in 1000 parts of phenol. While introducing a current of ammonia, the solution is kept gently boiling for 2 hours. After cooling, a nearly colorless product is precipitated from the mixture by means of ether; by recrystallization from dilute alcohol, admixed double chloride of zinc and ammonia is removed and, by dissolving the dried substance in a small quantity of alcohol and precipitating with ether, the 2-octenyl-4-amino-6-ethoxy-quinoline-hydrochloride of the following probable constitution

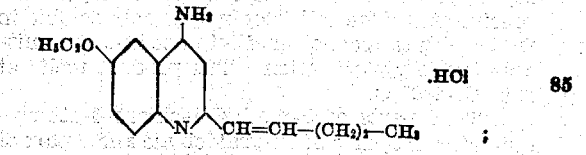

is obtained in the form of a colorless powder being only sparingly soluble in water.

2. 221.5 parts of 6-ethoxy-4-chloro-2-methyl-quinoline, 132 parts of cinnamic aldehyde and 1 part of zinc chloride are heated together for 2 hours, while stirring, at a temperature of 125° C.-130° C. 1500 parts by volume of double normal hydrochloric acid are then added to the viscous melt, whereby a yellow crystalline precipitate separates, which, after being filtered by suction, is washed with dilute hydrochloric acid and then with acetone and dried. The 2-(delta-phenylbutadienyl)-4-chloro-6-ethoxy-quinoline-hydrochloride is transformed, by trituration with dilute sodium carbonate solution, into the base, which, when recrystallized from alcohol, melts at 129° C.–131° C.

The 2-(delta-phenylbutadienyl)-4-chloro-6-ethoxy-quinoline is dissolved in three times its quantity of phenol while introducing ammonia; the mixture is kept gently boiling for 2 hours. On cooling and adding acetone a yellow crystalline magma is formed. After this has been allowed to stand in the cold for several hours, it is filtered and the solid matter is washed with acetone and recrystallized from methyl alcohol of 66% strength for completely purifying it. The 2-(delta-phenylbutadienyl)-4-amino-6-ethoxy-quinoline-hydrochloride of the following probable constitution

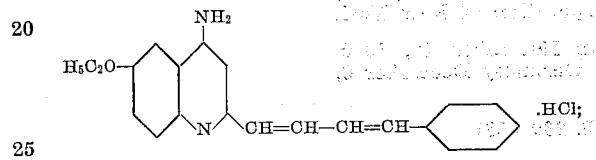

crystallizes in the form of fine yellow crystals containing water of crystallization which is eliminated by heating them in a vacuum at 150° C. It only sparingly dissolves in water. The base, separated from the aqueous solution of the salt by addition of caustic soda solution, melts at 185° C.–187° C.

3. 20 parts of 6-ethoxy-4-amino-2-methyl-quinoline, obtained by treating 6-ethoxy-4-chloro-2-methyl-quinoline in the presence of phenol with ammonia, 15 parts of butyraldehyde, 11 parts of acetic anhydride and 1 part of pulverized anhydrous zinc chloride are slowly heated, while stirring, and the mixture is kept for 1 hour in an oil bath of 130° C. The clear, yellowish-brown melt formed is poured into 500 parts of hot water and steam is passed through the solution until the excess of butyraldehyde is eliminated. Then 50 parts by volume of hydrochloric acid, having a specific gravity of 1.19, are added, whereby the 2-pentenyl-4-amino-6-ethoxy-quinoline-hydrochloride of the following probable constitution

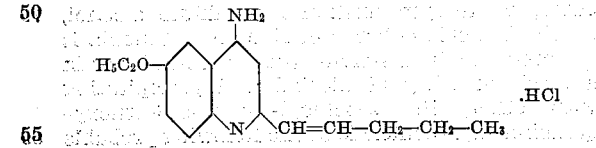

separates in the form of a colorless crystalline precipitate. The salt is only sparingly soluble in water; dilute alcohol or dilute acetone are suitable for recrystallization. The product melts at 228° C.–230° C.

4. 221.5 parts of 2-methyl-4-chloro-6-ethoxy-quinoline, 150 parts of butyraldehyde and 1 part of pulverized zinc chloride are heated for 1 hour on the water bath and then for 5 hours in a bath of 130° C.–135° C. Then the water which has been split off and aldehyde which has not reacted, are distilled in a vacuum. The residue, a greenish resinous mass, mainly consisting of 2-pentenyl-4-chloro-6-ethoxy-quinoline, is dissolved in 700 parts of phenol. The solution is heated for 2 hours to boiling temperature in a reflux apparatus while introducing a current of ammonia. After cooling the solution is precipitated with ether. After it has been allowed to stand for some time the salt is filtered by suction. By dissolving in methyl alcohol and precipitating with caustic soda solution, the base is separated in the form of a viscous smeary mass; after stirring several times with water containing ammonia and decanting, the base is dissolved in dilute acetic acid and a small quantity of undissolved brown flakes is filtered by suction. On addition of hydrochloric acid to the solution, there is precipitated the hydrochloride of 2-pentenyl-4-amino-6-ethoxy-quinoline of the following probable constitution

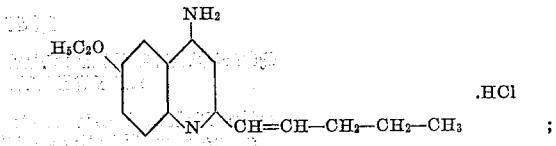

which is nearly insoluble in an excess of hydrochloric acid; for completely purifying it, it is recrystallized from dilute acetone. The salt is insoluble in dry acetone, only sparingly soluble in water, but easily soluble in acetone containing water. It is easily soluble in chloroform, benzene, acetic ester. It decomposes at about 237° C. The base, when precipitated from the hot aqueous solution of the salt with caustic soda solution, forms a colorless powder melting at 110° C.

I claim:

1. The compounds of the following formula:

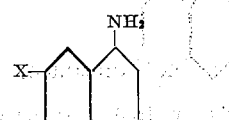

wherein X stands for hydrogen or alkoxy containing no more than 2 carbon atoms, R stands for alkyl or the phenylethylene group.

2. The compounds of the following formula

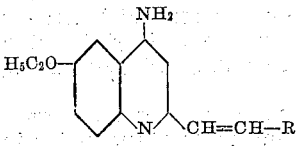

wherein R stands for propyl, hexyl or phenylethylenyl.

3. The compound of the following formula

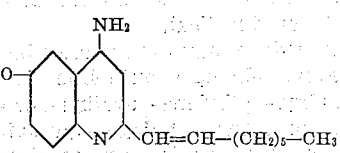

the hydrochloride of which is a colorless powder, sparingly soluble in water.

4. The compound of the following formula

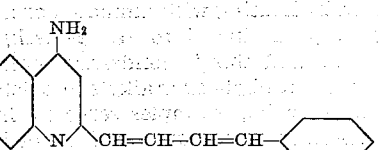

melting at 185° C.–187° C., the hydrochloride of which crystallizes in the form of fine yellow crystals containing water of crystallization which is eliminated at 150° C. in a vacuum.

5. The compound of the following formula
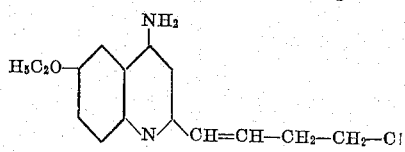
being a colorless powder, melting at about 110° C. whose hydrochloride forms colorless crystals, insoluble in anhydrous acetone, sparingly soluble in water, easily soluble in aqueous acetone, chloroform, benzene, acetic ester and decomposes at 237° C.
OTTO EISLEB.